(12) United States Patent
Baek et al.

(10) Patent No.: US 12,500,311 B2
(45) Date of Patent: Dec. 16, 2025

(54) BATTERY MODULE AND BATTERY PACK INCLUDING THE SAME

(71) Applicant: LG Energy Solution, Ltd., Seoul (KR)

(72) Inventors: Seung Ryul Baek, Daejeon (KR); Jungmin Kwak, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 735 days.

(21) Appl. No.: 17/767,528

(22) PCT Filed: Jul. 6, 2021

(86) PCT No.: PCT/KR2021/008577
§ 371 (c)(1),
(2) Date: Apr. 8, 2022

(87) PCT Pub. No.: WO2022/010228
PCT Pub. Date: Jan. 13, 2022

(65) Prior Publication Data
US 2023/0411797 A1 Dec. 21, 2023

(30) Foreign Application Priority Data
Jul. 6, 2020 (KR) .......................... 10-2020-0082996

(51) Int. Cl.
*H01M 50/507* (2021.01)
*H01M 50/204* (2021.01)
(Continued)

(52) U.S. Cl.
CPC ....... *H01M 50/507* (2021.01); *H01M 50/204* (2021.01); *H01M 50/249* (2021.01); *H01M 50/517* (2021.01); *H01M 2220/20* (2013.01)

(58) Field of Classification Search
CPC ............. H01M 50/507; H01M 50/249; H01M 50/517; H01M 50/209
See application file for complete search history.

(56) References Cited

U.S. PATENT DOCUMENTS 8,580,423 B2    11/2013   Kim
2006/0214631 A1  9/2006   Yoon et al.
(Continued)

FOREIGN PATENT DOCUMENTS

CN    105531850 A    4/2016
CN    110832692 A    2/2020
(Continued)

OTHER PUBLICATIONS

Reference_KR20170066896A _ESPACENET_Translation (Year: 2017).*

(Continued)

*Primary Examiner* — Haroon S. Sheikh
(74) *Attorney, Agent, or Firm* — Lerner David LLP

(57) ABSTRACT

A battery module according to an embodiment of the present disclosure includes: a battery cell stack in which a plurality of battery cells are stacked; a busbar frame located on the front and rear surfaces of the battery cell stack; and at least one busbar mounted on the busbar frame, wherein the busbar is mounted between a plurality of partition walls formed on the busbar frame, the partition wall is formed with at least one protrusion extending toward the outer surface of the busbar, and the protrusion and the busbar are in contact with each other.

14 Claims, 7 Drawing Sheets

(51) Int. Cl.
   *H01M 50/249*   (2021.01)
   *H01M 50/517*   (2021.01)

(56) References Cited

U.S. PATENT DOCUMENTS

| | | | | |
|---|---|---|---|---|
| 2010/0288532 A1* | 11/2010 | Ikeda | ................... | H01R 31/085 |
| | | | | 174/133 B |
| 2013/0164595 A1* | 6/2013 | Takase | .............. | H01M 10/6554 |
| | | | | 429/120 |
| 2014/0329413 A1* | 11/2014 | Ogasawara | .......... | H01R 9/2416 |
| | | | | 439/627 |
| 2015/0303415 A1 | 10/2015 | Kayano et al. | | |
| 2016/0233476 A1 | 8/2016 | Okamoto et al. | | |
| 2020/0112014 A1 | 4/2020 | Kim et al. | | |
| 2020/0144580 A1 | 5/2020 | Hong et al. | | |
| 2020/0176745 A1 | 6/2020 | Lee | | |
| 2020/0185682 A1 | 6/2020 | Kim et al. | | |
| 2020/0203698 A1 | 6/2020 | Jin et al. | | |
| 2021/0043908 A1 | 2/2021 | Nagafuchi et al. | | |

FOREIGN PATENT DOCUMENTS

| | | |
|---|---|---|
| CN | 110915024 A | 3/2020 |
| EP | 2894695 A2 | 7/2015 |
| JP | 2008530730 A | 8/2008 |
| JP | 2015056342 A | 3/2015 |
| JP | 2019160736 A | 9/2019 |
| JP | 2020518988 A | 6/2020 |
| KR | 20150052755 A | 5/2015 |
| KR | 20170039941 A | 4/2017 |
| KR | 101732285 B1 | 5/2017 |
| KR | 20170066896 A | 6/2017 |
| KR | 20170092740 A | 8/2017 |
| KR | 20190054709 A | 5/2019 |
| KR | 20190071454 A | 6/2019 |
| KR | 20190073933 A | 6/2019 |
| KR | 20200069720 A | 6/2020 |

OTHER PUBLICATIONS

International Search Report for PCT/KR2021/008577 dated Nov. 2, 2021. 3 pgs.
European Search Report issued in Appln. No. 21838028.5 mailed Jun. 21, 2024 (7 pages).
Search Report dated Sep. 15, 2023 from the Office Action for Chinese Application No. 202180006140.8 issued Sep. 16, 2023, 2 pages. [See p. 1, categorizing the cited references].

* cited by examiner

[FIG. 1]
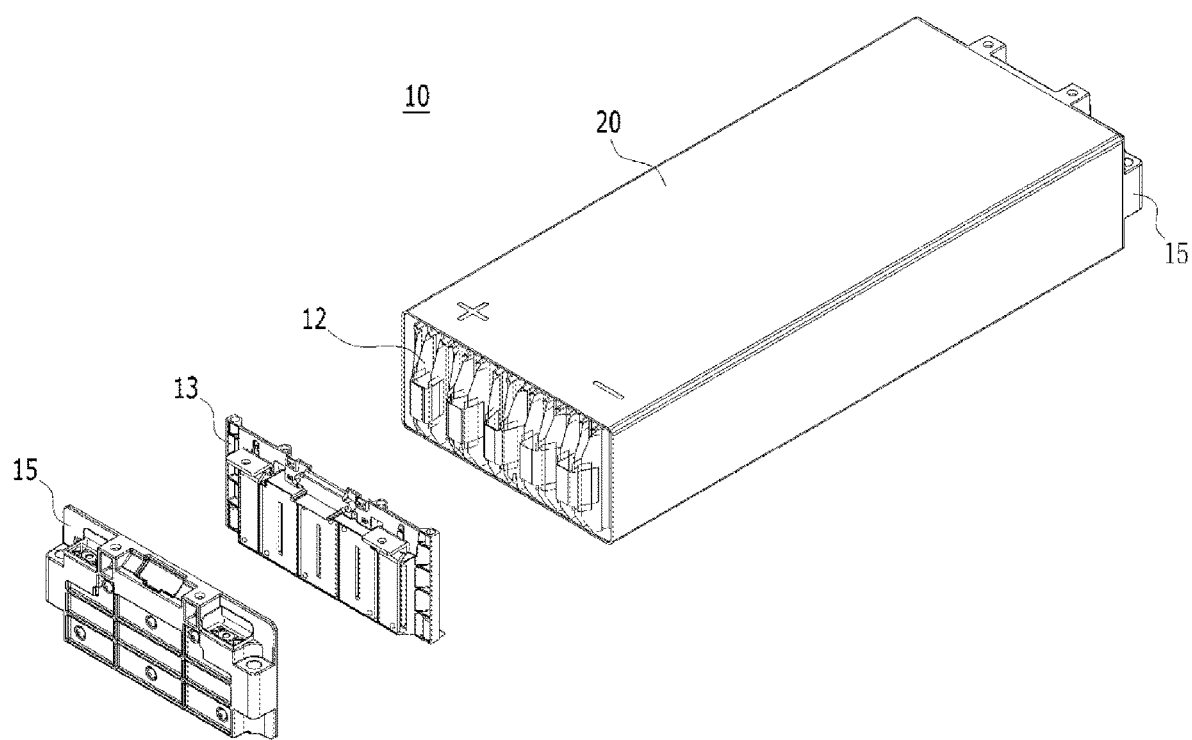
PRIOR ART

【FIG. 2】
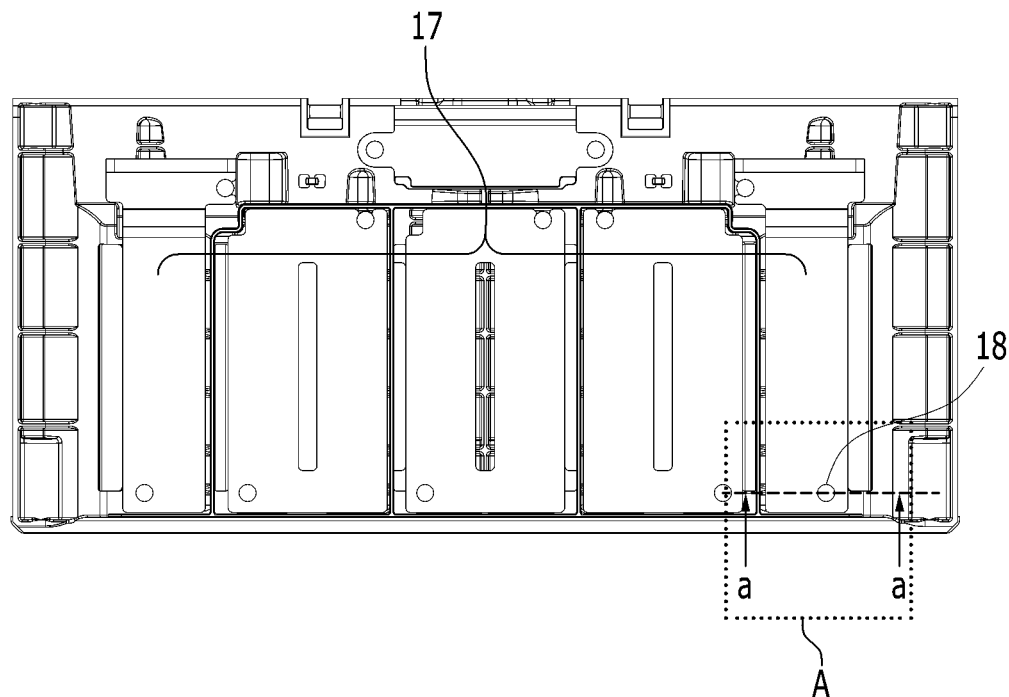
PRIOR ART
【FIG. 3】
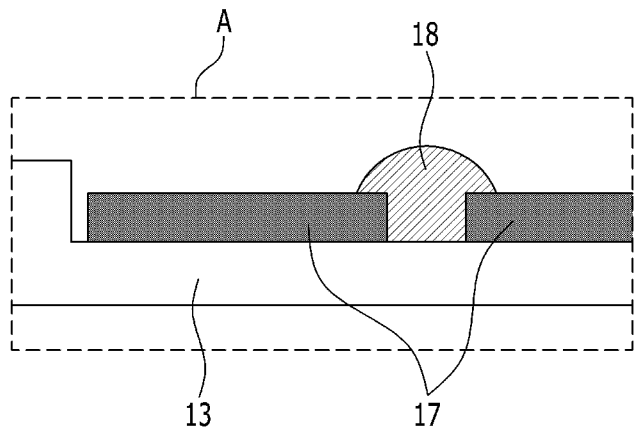
PRIOR ART

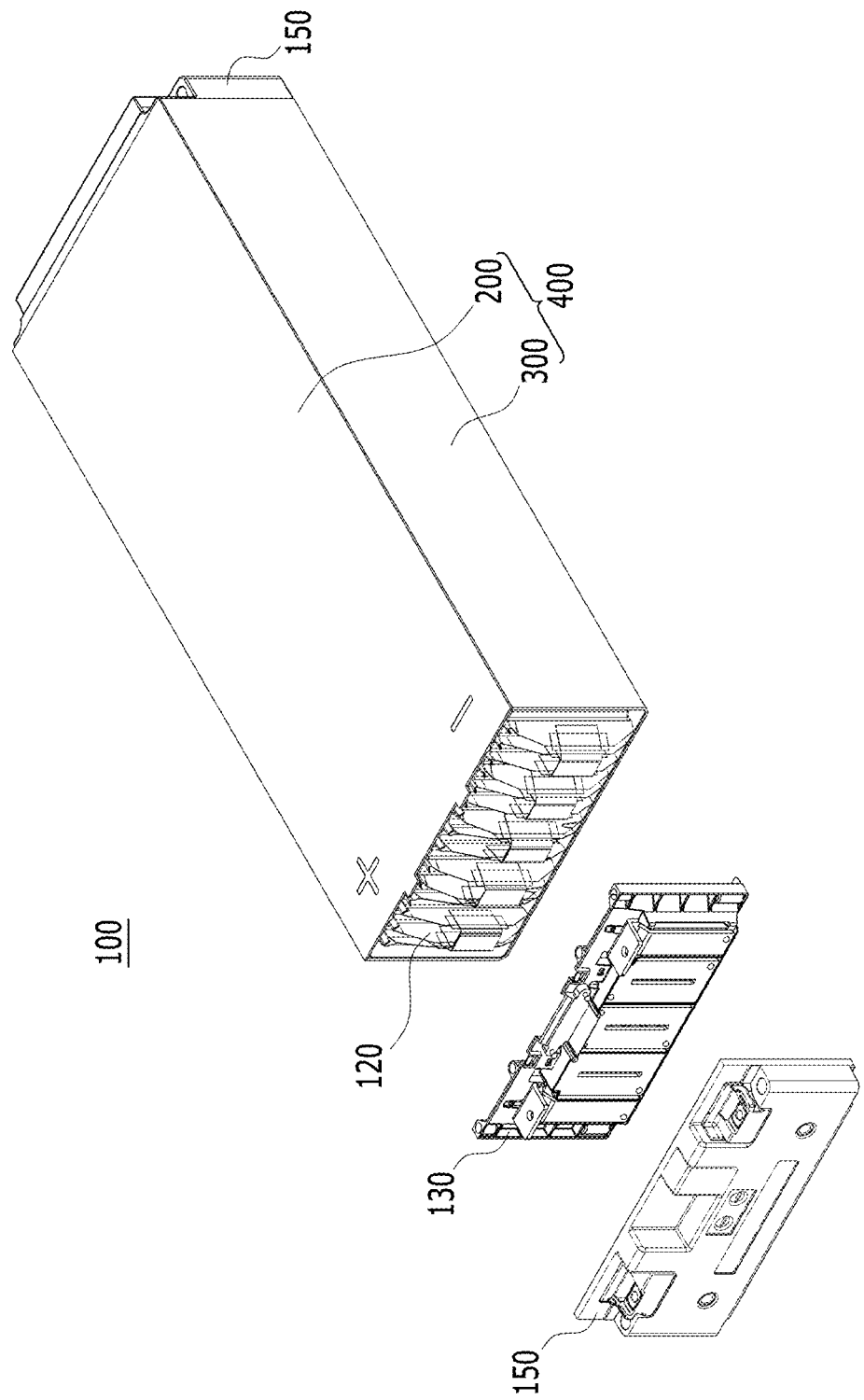

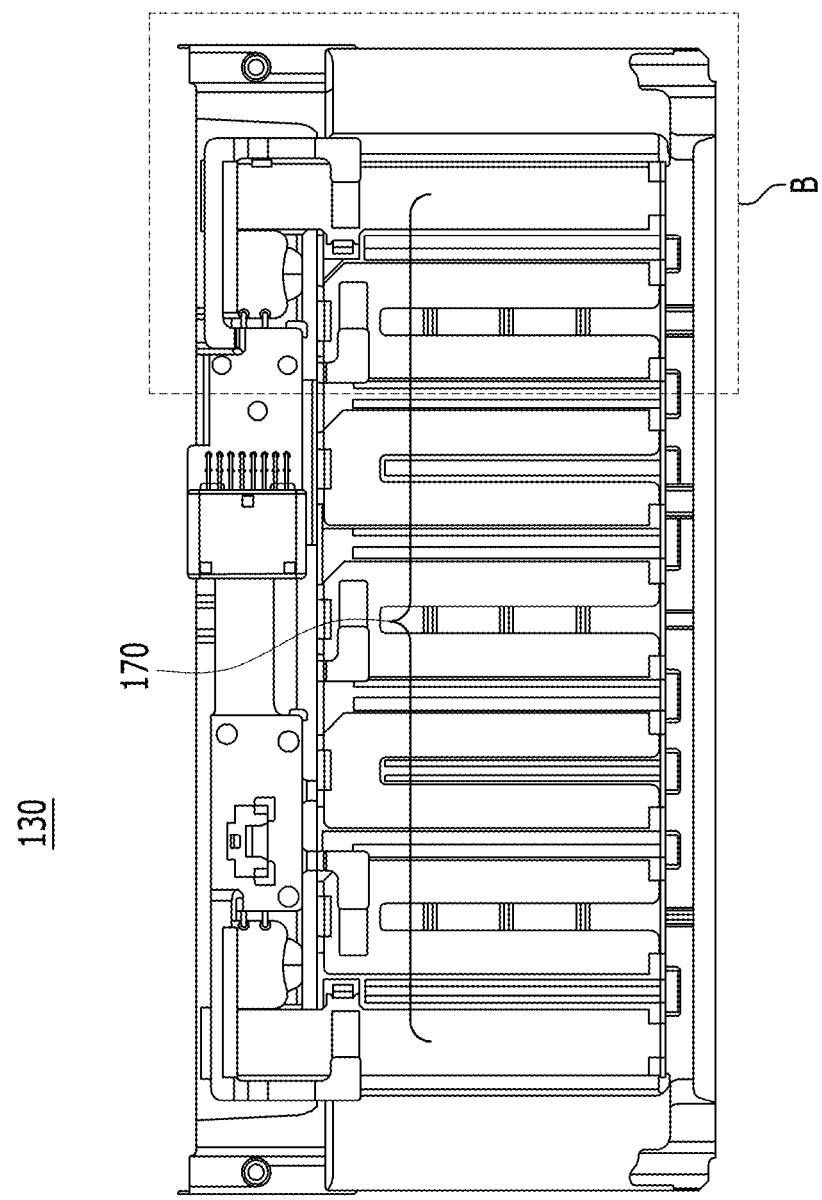

[FIG. 6]
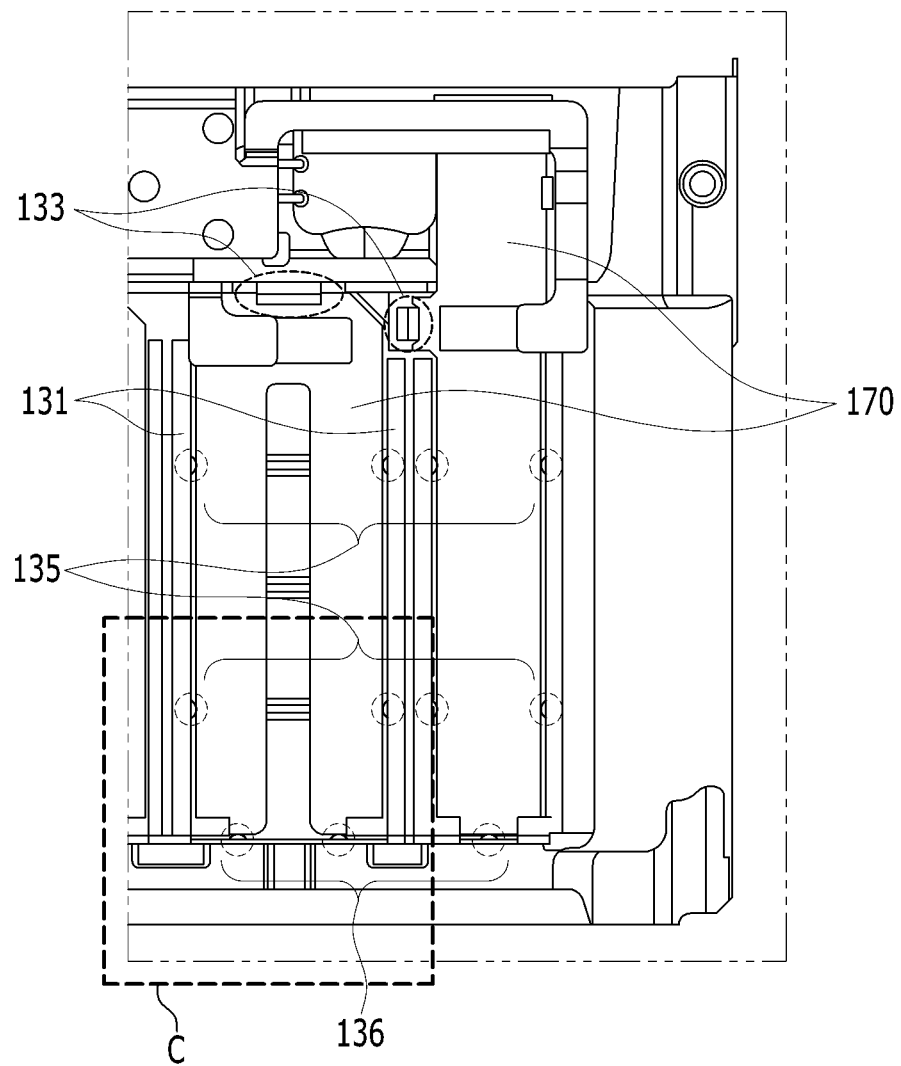

[FIG. 7]
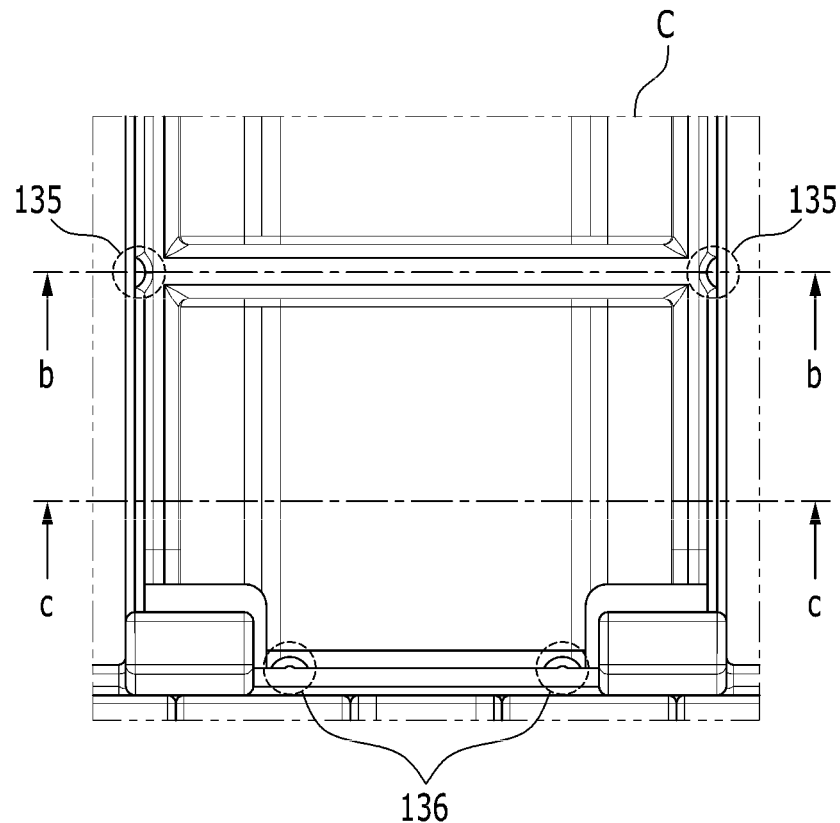
[FIG. 8]
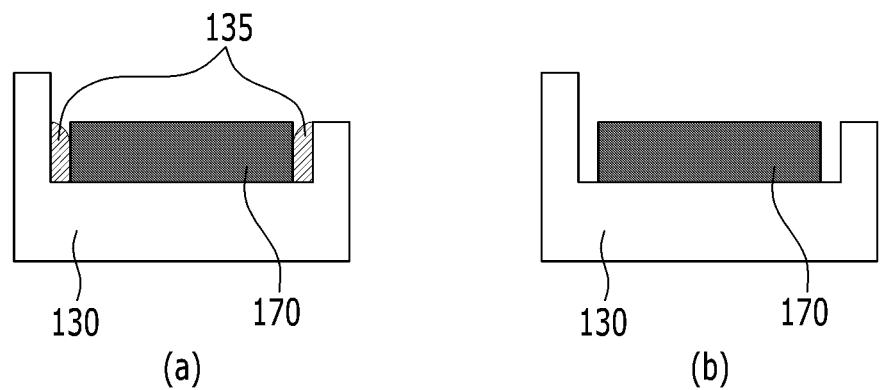

[FIG. 9]
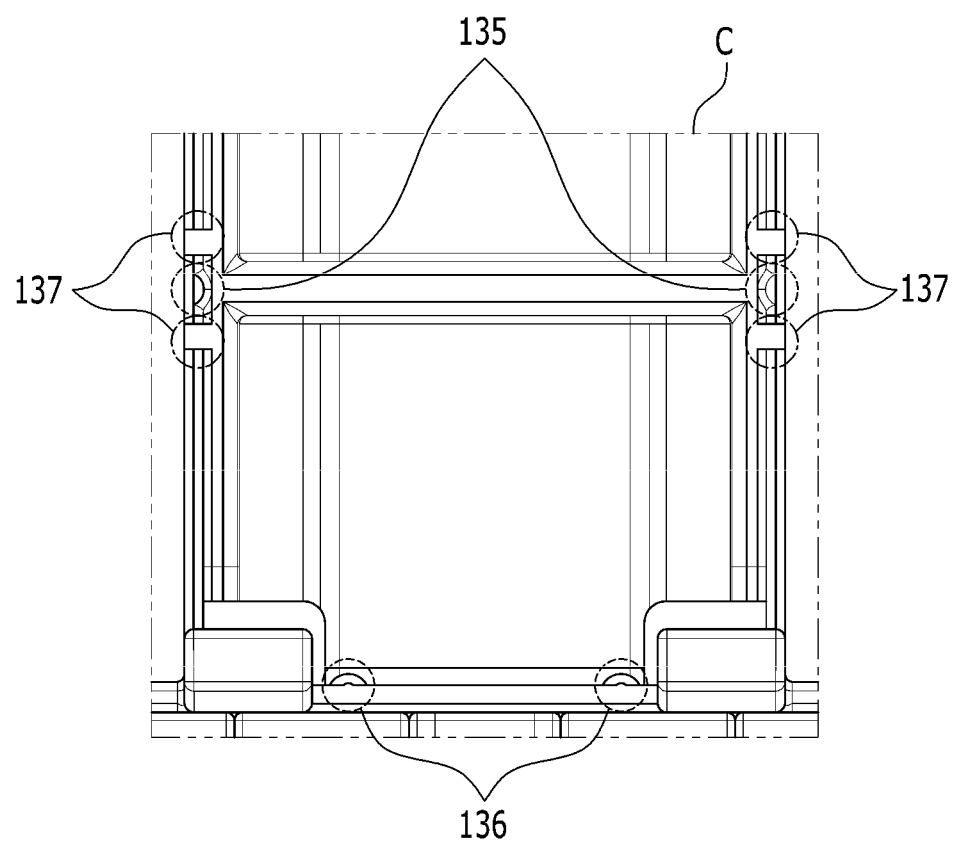

BATTERY MODULE AND BATTERY PACK INCLUDING THE SAME

CROSS-REFERENCE TO RELATED APPLICATIONS

This application is a national phase entry under 35 U.S.C. § 371 of International Application No. PCT/KR2021/008577, filed on Jul. 6, 2021, and claims the benefit of Korean Patent Application No. 10-2020-0082996 filed on Jul. 6, 2020 with the Korean Intellectual Property Office, the disclosures of which are each incorporated herein by reference in their entirety.

TECHNICAL FIELD

The present disclosure relates to a battery module and a battery pack including the same, and more particularly, to a battery module that mounts a busbar to a busbar frame without a heat fusion process, and a battery pack including the same.

BACKGROUND ART

As technology develops and demands for mobile devices increase, the demand for batteries as energy sources is rapidly increasing. In particular, a secondary battery has attracted considerable attention as an energy source for power-driven devices, such as an electric bicycle, an electric vehicle, and a hybrid electric vehicle, as well as an energy source for mobile devices, such as a mobile phone, a digital camera, a laptop computer and a wearable device.

Secondary batteries that are widely used at the present include lithium ion batteries, lithium polymer batteries, nickel cadmium batteries, nickel hydrogen batteries, nickel zinc batteries and the like. An operating voltage of the unit secondary battery cell is about 2.5V to 4.2V. Therefore, if a higher output voltage is required, a battery module is also configured by connecting a plurality of battery cells in series or by connecting a plurality of battery cells in series and in parallel depending on charge/discharge capacity.

When a middle- or large-sized battery module is configured by electrically connecting a plurality of battery cells in series or parallel, pouch-type secondary battery cells having high energy density and being easily stacked are often used, and these cells are stacked to configure a battery cell stack. Next, a method of packaging the battery cell stack in a module frame, protecting it, and adding electrical components for the electrical connection and voltage measurement of battery cells to configure a battery module is common. Further, the battery module includes a busbar frame for mounting busbars on the front and rear surfaces of the battery cell stack, and a separate process is required in order for the busbar to be mounted on the busbar frame. However, the battery module needs to be manufactured in a minimized process in order to reduce the manufacturing cost and the manufacturing time.

DETAILED DESCRIPTION OF THE INVENTION

Technical Problem

It is an object of the present disclosure to provide a battery module that simplifies the process by mounting the busbar to the busbar frame without a heat fusion process.

The objects of the present disclosure are not limited to the aforementioned objects, and other objects which are not described herein should be clearly understood by those skilled in the art from the following detailed description and appended claims.

Technical Solution

According to one embodiment of the present disclosure, there can be provided a battery module comprising: a battery cell stack in which a plurality of battery cells are stacked; a busbar frame located on the front and rear surfaces of the battery cell stack; and at least one busbar mounted on the busbar frame, wherein the busbar is mounted between a plurality of partition walls formed on the busbar frame, the partition wall is formed with at least one protrusion extending toward the outer surface of the busbar, and the protrusion and the busbar are in contact with each other.

The partition wall may further include at least a pair of coupling auxiliary portions that are arranged so that the outer surface of the busbar is exposed.

The at least one protrusion may be located between the pair of coupling auxiliary portions.

The at least one protrusions includes a plurality of protrusions, each one of the plurality of protrusions being respectively formed at positions corresponding to both side surfaces of the busbar in the partition wall, and being in contact with the side surfaces of the busbar.

The plurality of protrusions may be respectively formed at positions corresponding to the side surfaces of a central portion of the busbar.

The plurality of protrusions may include first protrusions respectively formed at positions corresponding to both side surfaces of the upper portion of the busbar, and include second protrusions respectively formed at positions corresponding to the side surfaces of a lower portion of the busbar.

The first protrusion and the second protrusion may be spaced from each other.

The plurality of protrusion may be formed on a lower portion of the busbar frame corresponding to a lower surface of the lower portion of the busbar.

The protrusion may be formed on an upper portion of the busbar frame corresponding to an upper surface of the upper portion of the busbar.

The battery module may further include a fixing member that is formed on the upper portion of the busbar frame corresponding to the upper surface of the upper portion of the busbar.

The fixing member has a snap-fit structure, and the busbar is coupled via a snap fit connection to an inside of the fixing member.

According to one embodiment of the present disclosure, there can be provided a battery pack comprising the above-mentioned battery module.

Advantageous Effects

According to embodiments, the battery module and the battery pack including the same according to an embodiment of the present disclosure can prevent the flow of the busbar by fixing the busbar to the busbar frame without a heat fusion process. Also, since it cannot be subjected to a separate coupling process such as heat fusion between the busbar and the busbar frame, the manufacturing cost and the manufacturing time can be reduced, and productivity can be improved.

In addition, deterioration of product quality occurring in a separate coupling process can be prevented, a loss of raw materials of the busbar caused by the separate coupling process can be reduced, and the rigidity of the busbar can be increased.

The effects of the present disclosure are not limited to the effects mentioned above, and additional other effects not described above will be clearly understood from the following detailed description and appended drawings by those skilled in the art.

BRIEF DESCRIPTION OF THE DRAWINGS

FIG. 1 is an exploded perspective view showing a conventional battery module;

FIG. 2 is a diagram showing a busbar frame on which a busbar is mounted in the battery module of FIG. 1;

FIG. 3 is a cross-sectional view of a region A of FIG. 2, taken along the cutting line a-a;

FIG. 4 is an exploded perspective view showing a battery module according to an embodiment of the present disclosure;

FIG. 5 is a diagram showing a busbar frame on which a busbar is mounted in the battery module of FIG. 4;

FIG. 6 is an enlarged view of a region B of FIG. 5;

FIG. 7 is an enlarged view of a region C of FIG. 6 after removing the busbar from the busbar frame of FIG. 5;

FIG. 8 is a cross-sectional view of the region C of FIG. 7 in which the busbar is mounted, taken along the cutting lines b-b and c-c; and FIG. 9 is an enlarged view of region C of FIG. 6 in a battery module according to another embodiment of the present disclosure.

DETAILED DESCRIPTION OF THE EMBODIMENTS

Hereinafter, various embodiments of the present disclosure will be described in detail with reference to the accompanying drawings so that those skilled in the art can easily carry out them. The present disclosure may be modified in various different ways, and is not limited to the embodiments set forth herein.

A description of parts not related to the description will be omitted herein for clarity, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

Further, throughout the specification, when a portion is referred to as "including" a certain component, it means that the portion can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

Below, the battery module according to one embodiment of the present disclosure will be described. However, the description herein is made based on the front surface among the front and rear surfaces of the battery module, without being necessarily limited thereto, and even in the case of the rear surface, a description may be given with the same or similar contents.

FIG. 1 is an exploded perspective view showing a conventional battery module.

Referring to FIG. 1, the conventional battery module 10 includes a battery cell stack 12 formed by stacking a plurality of battery cells, a module frame 20 for housing the battery cell stack 12, and an end plate 15 for covering the front and rear surfaces of the battery cell stack 12. Further, the battery module 10 further includes a busbar frame 13 located between the end plate 15 and the battery cell stack 12.

FIG. 2 is a diagram showing a busbar frame on which a busbar is mounted in the battery module of FIG. 1. FIG. 3 is a cross-sectional view of a region A of FIG. 2, taken along the cutting line a-a.

Referring to FIGS. 2 and 3, the busbar 17 included in the battery module may be mounted on the busbar frame 13 by a heat fusion process. The busbar 17 is formed with a heat fusion hole 18 for injecting a heat fusion material according to the heat fusion process, and the busbar 17 can be fixed to the busbar frame 13 by the heat fusion material injected through the heat fusion hole 18.

However, when the busbar 17 is mounted on the busbar frame 13 by the heat fusion process in this way, the amount of burr generated is increased due to the characteristics of the heat fusion process, and the quality of the product may be deteriorated. Further, as a separate additional process such as a heat fusion process is performed in order to mount the busbar 17 to the busbar frame 13, the manufacturing cost and the manufacturing time of the battery module can be increased. Further, from the viewpoint that the heat fusion hole 18 must be formed in the busbar 17 in order to couple the busbar 17 and the busbar frame 13, a loss of raw materials of the busbar 17 occurs, and the rigidity of the busbar 17 can be reduced. In addition, since the busbar 17 needs to be further subjected to a separate process for forming the heat fusion hole 18, the manufacturing cost and the manufacturing time can be further increased.

Thereby, in the embodiments of the present disclosure, a busbar frame that can replace a separate process such as a conventional heat fusion process of a battery module will be described later.

Hereinafter, the busbar and the busbar frame according to one embodiment of the present disclosure will be described, but particularly, the busbar frame will be intensively described.

FIG. 4 is an exploded perspective view showing a battery module according to an embodiment of the present disclosure.

Referring to FIG. 4, the battery module 100 according to this embodiment includes a battery cell stack 120 formed by stacking a plurality of battery cells, a module frame 400 for housing the battery cell stack 120, and end plates 150 for covering the front and rear surfaces of the battery cell stack 120. Further, the battery module 100 further includes a busbar frame 130 located between the end plate 150 and the battery cell stack 120.

As an example, the module frame 400 includes an upper plate 200 for covering the upper portion of the battery cell stack 120, and a U-shaped frame 300, of which an upper surface, a front surface, and a rear surface are opened. However, the module frame 400 is not limited thereto and can be replaced by a frame of another shape, such as an L-shaped frame or a mono frame surrounding the battery cell stack 120 excluding front and rear surfaces thereof.

FIG. 5 is a diagram showing a busbar frame on which a busbar is mounted in the battery module of FIG. 4. FIG. 6 is an enlarged view of a region B of FIG. 5.

Referring to FIGS. 4 and 5, the battery module 100 according to one embodiment of the present disclosure includes a busbar frame 130, wherein the busbar frame 130 can be mounted with at least one busbar 170. Further, the busbar frame 130 is mounted with a busbar 170 that electrically connects the electrode leads of the battery cell stack 120, so that the battery cell stack 120 stacked in parallel can be electrically connected.

Referring to FIGS. 5 and 6, the busbar frame 130 can have a plurality of partition walls 131 formed therein. Here, the busbar 170 can be mounted between the plurality of partition walls 131 formed in the busbar frame 130. Thereby, the busbar 170 can be protected from external impact. Further, the partition wall 131 can be extendedly formed in a direction corresponding to the longitudinal direction of the busbar 170. In addition to this, the partition wall 131 can be extendedly formed in a direction corresponding to the width direction of the busbar frame 130, whereby the upper and lower portions of the busbar 170 can also be protected from external impact.

The partition wall 131 can be protruded in a direction perpendicular to the busbar frame 130. The partition wall 131 may have a height corresponding to the thickness of the busbar 170 in the busbar frame 130. Here, the barrier wall 131 has a height equal to or greater than the thickness of the busbar 170, thereby capable of protecting the busbar 170 from external impact.

Further, the partition wall 131 may have a length corresponding to the length of the busbar 170 in the busbar frame 130. Here, the partition wall 131 can be formed to extend by a length required for fixing the busbar 170. Therefore, the battery module 100 according to this embodiment can minimize the region where the partition wall 131 is formed while the partition wall 131 protects the busbar 170, thereby having an advantage that the weight and the manufacturing cost of the busbar frame 130 can be relatively reduced.

Referring to FIGS. 5 and 6, the partition wall 131 is formed with at least one protrusion 135 and 136 extending toward the outer surface of the busbar 170.

The protrusions 135 and 136 may include side surface protrusions 135 and upper and lower surface protrusions 136. Here, the side surface protrusions 135 are respectively formed at positions corresponding to both side surfaces of the busbar 170 in the partition wall 131, and both side surfaces of the busbar 170 may be in contact with the side surface protrusions 135, respectively. The side surface protrusions 135 may be respectively formed at positions corresponding to both sides of the central portion of the busbar 170. Thereby, the side surface protrusion 135 can prevent the busbar 170 from being flowed as it moves in the left and right directions due to the movement or use of the battery module 100.

Further, the side surface protrusions may include first protrusions respectively formed at positions corresponding to both side surfaces of the upper portion of the busbar 170, and include second protrusions respectively formed at positions corresponding to both side surfaces of the lower portion of the busbar 170. Here, the first protrusion and the second protrusion may be separated from each other. Thereby, in the battery module 100 according to this embodiment, a predetermined force is applied to a gap separated between the first protrusion and the second protrusion, so that the busbar 170 can be attached and detached, if necessary.

The upper and lower surface protrusions 136 may be formed on a lower portion of the busbar frame 130 corresponding to a lower surface of the lower portion of the busbar 170. Further, the upper and lower surface protrusions 136 may be formed on the upper portion of the busbar frame 130 corresponding to the upper surface of the upper portion of the busbar 170. If the partition wall 131 is formed at positions corresponding to the upper and lower portions of the busbar 170, the upper and lower surface protrusions 136 may be formed on the partition wall 131. Thereby, the upper and lower surface protrusions 136 can prevent the busbar 170 from being flown as it moves in the direction of gravity due to its own weight.

FIG. 7 is an enlarged view of a region C of FIG. 6 after removing the busbar from the busbar frame of FIG. 5. FIG. 8 is a cross-sectional view of the region C of FIG. 7 in which the busbar is mounted, taken along the cutting lines b-b and c-c. FIG. 8(*a*) is a cross-sectional view of a region C of FIG. 7 taken along the cutting line b-b, and FIG. 8(*b*) is a cross-sectional view of a region C of FIG. 7, taken along the cutting line c-c. In the case of FIG. 8, the side surface protrusions 135 is mainly described, but the upper and lower surface protrusions may also be described similarly.

Referring to FIG. 7, the protrusions 135 and 136 may have a structure that is injected together with the partition wall 131 or the busbar frame 130, and can be manufactured and attached separately from the partition wall 131 or the busbar frame 130. The protrusions 135 and 136 may be formed of the same material as the partition wall 131 or the busbar frame 130, or may be formed of a material having a greater frictional force than the partition wall 131 or the busbar frame 130.

In the case of a structure in which the protrusions 135 and 136 are formed of the same material as the partition wall 131 to be injected together with the partition wall 131 or the busbar frame 130, there is an advantage that the manufacturing process of the busbar frame 130 is simplified, and the manufacturing cost can also be reduced. In the case of a structure in which the protrusions 135 and 136 are formed of a material having a greater frictional force than the partition wall 131 or the busbar frame 130 to be attached to the partition wall 131 or the busbar frame 130, it is possible to reduce the possibility of flowability of the busbar 170 by the protrusions 135 and 136 and improve the fixing force of the busbar 170.

The protrusions 135 and 136 may have various shapes, such as a semicircle shape or a square shape. In particular, the protrusions 135 and 136 may have flat or gentle shape at the end making contact with the busbar 170. Thereby, the protrusions 135 and 136 are fixed in contact with the busbar 170, so that the outer surface of the busbar 170 can be prevented from being damaged.

Referring to FIGS. 6 to 8, the protrusions 135 and 136 may make contact with at least a portion of an outer surface of the busbar 170. Thereby, the busbar 170 is press-fitted to the busbar frame 130 by the protrusions 135 and 136, thereby eliminating or greatly reducing the possibility of the flowability of the busbar 170.

Here, the press-fitting means that, referring to FIG. 8(*a*), the busbar 170 makes contact with the side surface protrusion 135 by the protruding shape of the side surface protrusion 135, so that the attachment/detachment of the busbar 170 is restricted. In addition, the distance between the side surface protrusions 135 corresponding to both sides of the busbar 170 but located at the same height is formed smaller than the width of the busbar 170, so that the busbar 170 can be more strongly fixed by the side surface protrusion 135. In this way, the position, number, shape, size, etc. of the side surface protrusions 135 can be adjusted as needed, thereby adjusting the fixing force of the busbar 170 to the busbar frame 130.

Further, referring to FIG. 8(b), the side surface protrusions 135 may not be formed on at least a part of both sides of the busbar 170. Therefore, in the battery module 100 according to this embodiment, a predetermined force is applied to a gap separated between the partition wall 131 and the busbar 170, so that the busbar 170 can be attached/detached as needed.

Accordingly, in the battery module 100 according to the embodiment of the present disclosure, the busbar 170 is fixed to the busbar frame 130 and thus cannot be flown in the busbar frame 130, and the busbar 170 may be stably connected to the electrode lead of the battery cell stack 120. Further, the busbar 170 can be mounted to the busbar frame 130 with a strong fixing force without a separate process such as a heat fusion process. Further, the busbar 170 and the busbar frame 130 are structurally fixed according to the frictional force generated between the protrusions 135 and 136 and the busbar 170, so that unlike the coupling according to the heat fusion process, even if the battery module 100 is overheated, the fixing force can be maintained.

In addition to this, referring to FIG. 6, the battery module 100 according to another embodiment of the present disclosure may further include a fixing member 133. Therefore, the fixing member 133 can improve the fixing force of the busbar 170 by the protrusions 135 and 136 and assist the fixation of the busbar 170.

The fixing member 133 has a snap-fit structure, and the upper portion of the busbar 170 can be snap-fit coupled to the inside of the fixing member 133. Here, the snap-fit coupling structure means that, referring to FIG. 6, the busbar 170 is caught by the fixing member 133 due to the protruding shape of the fixing member 133, so that the attachment/detachment of the busbar 170 is restricted. In addition, if necessary, the position, shape, size, etc. of the fixing member 133 can be adjusted, thereby adjusting the fixing force of the busbar 170 to the busbar frame 130.

FIG. 9 is an enlarged view of a region C of FIG. 6 in a battery module according to another embodiment of the present disclosure.

Referring to FIG. 9, the partition wall 131 may further include at least a pair of coupling auxiliary portions 137 that are formed so that at least a part of an outer surface of the busbar 170 is exposed. Here, the side surface protrusion 135 can be located between the pair of coupling auxiliary portions 137.

The pair of coupling auxiliary portions 137 may be located adjacent to the side surface protrusions 135. As the pair of coupling auxiliary portions 137 are located more adjacent to the side surface protrusion 135, the flexibility of the partition wall 131 on which the side surface protrusion 135 is located can be increased. Therefore, the pair of coupling auxiliary parts 137 are located adjacent to the side surface protrusions 135, whereby the battery module 100 according to this embodiment allows the busbar 170 to be more easily mounted to the busbar frame 130.

However, when the pair of coupling auxiliary portions 137 are excessively adjacent to the side surface protrusions 135, the rigidity of the partition wall 131 in which the side surface protrusion 135 is located can be reduced, and it can be damaged due to external impact or attachment/detachment of the busbar 170. Thereby, the pair of coupling auxiliary portions 137 may be located separately at an appropriate distance from the side surface protrusions 135 in the partition wall 131. Further, if necessary, the position of the pair of coupling auxiliary portions 137, the degree of exposure, and the like can be adjusted, thereby adjusting the fixing force of the busbar 170 with respect to the side surface protrusion 135.

In addition, although not shown in FIG. 9, if the partition wall 131 is formed at positions corresponding to the upper and lower portions of the busbar 170, a pair of coupling auxiliary portions (not shown) are formed on the upper and lower surface protrusions 136 and the partition wall 131, and the upper and lower surface protrusions 136 can be located between a pair of coupling auxiliary portions (not shown). However, even in such a case, the pair of coupling auxiliary portions (not shown) are located separately at an appropriate distance from the upper and lower surface protrusions 135 in the partition wall 131, whereby the battery module 100 according to this embodiment can prevent damage due to the load on the busbar 17 and the attachment/detachment of the busbar 170.

Meanwhile, the battery pack according to the embodiments of the present disclosure can be applied to various devices. Such a device may be applied to a vehicle means such as an electric bicycle, an electric vehicle, or a hybrid vehicle, but the present disclosure is not limited thereto, and is applicable to various devices that can use a battery module, which also belongs to the scope of the present disclosure.

Although the invention has been shown and described with reference to the preferred embodiments, the scope of the present disclosure is not limited thereto, and various modifications and improvements made by those skilled in the art using the basic concepts of the present disclosure, which are defined in the appended claims, also belong to the scope of the present disclosure.

DESCRIPTION OF REFERENCE NUMERALS

110: battery cell
120: battery cell stack
130: busbar frame
170: busbar
400: module frame

The invention claimed is:

1. A battery module comprising:
a battery cell stack in which a plurality of battery cells are stacked;
a busbar frame located on the front and rear surfaces of the battery cell stack; and
at least one busbar mounted on the busbar frame,
wherein the busbar is mounted between a plurality of partition walls formed on the busbar frame,
wherein the partition wall is formed with at least one protrusion extending toward the outer surface of the busbar, the outer surface having a contact edge extending linearly from ends of the busbar that oppose one another along a longitudinal direction of the busbar, so as that the at least one protrusion engages the contact edge, and
wherein the protrusion and the busbar are in contact with each other, so as to fix the busbar to the busbar frame.

2. The battery module of claim 1, wherein the partition wall further comprises at least a pair of coupling auxiliary portions that are arranged so that the outer surface of the busbar is exposed.

3. The battery module of claim 2, wherein the at least one protrusion is located between the pair of coupling auxiliary portions.

4. The battery module of claim 1, wherein the at least one protrusion includes a plurality of protrusions, each one of the plurality of protrusions being respectively formed at positions corresponding to a side surface of the busbar in the partition wall, and being in contact with the side surfaces of the busbar.

5. The battery module of claim 4, wherein the plurality of protrusions are respectively formed at positions corresponding to the side surfaces of a central portion of the busbar.

6. The battery module of claim 4, wherein the plurality of protrusions comprise first protrusions respectively formed at positions corresponding to the side surfaces of an upper portion of the busbar, and comprise second protrusions respectively formed at positions corresponding to the side surfaces of a lower portion of the busbar.

7. The battery module of claim 6, wherein the first protrusions and the second protrusions are spaced from each other.

8. The battery module of claim 4, wherein: the plurality of protrusion is formed on a lower portion of the busbar frame corresponding to a lower surface of the lower portion of the busbar.

9. The battery module of claim 8, wherein: the protrusion is formed on an upper portion of the busbar frame corresponding to an upper surface of the upper portion of the busbar.

10. The battery module of claim 9, which further comprises a fixing member that is formed on the upper portion of the busbar frame corresponding to the upper surface of the upper portion of the busbar.

11. The battery module of claim 10, wherein the fixing member has a snap-fit structure, and
the busbar is coupled via a snap-fit connection to an inside of the fixing member.

12. The battery module of claim 1, wherein a contact edge of the protrusion and the contact edge of the busbar contact each other along a plane therebetween, so as to be fixed by a friction fit to each other.

13. A battery pack comprising the battery module of claim 1.

14. A battery module comprising:
a battery cell stack in which a plurality of battery cells are stacked;
a busbar frame located on the front and rear surfaces of the battery cell stack; and
at least one busbar mounted on the busbar frame,
wherein the busbar is mounted between a plurality of partition walls formed on the busbar frame,
the partition wall is formed with at least one protrusion extending toward the outer surface of the busbar, and
the protrusion and the busbar are in contact with each other,
wherein the partition wall further comprises at least a pair of coupling auxiliary portions that are arranged to define a plurality of openings, so that the outer surface of the busbar is exposed, and
wherein the plurality of openings are disposed adjacent to the at least one protrusion, so as to increase a flexibility of a portion of the partition wall on which the at least one protrusion is disposed.

* * * * *